(12) United States Patent
Orr (10) Patent No.: US 9,562,612 B2
(45) Date of Patent: Feb. 7, 2017

(54) PRESSURE CONTROL VALVE ASSEMBLY

(71) Applicant: HVA, LLC, Reno, NV (US)

(72) Inventor: Matthew Orr, Truckee, CA (US)

(73) Assignee: HVA, LLC, Reno, NV (US)

( * ) Notice: Subject to any disclaimer, the term of this patent is extended or adjusted under 35 U.S.C. 154(b) by 11 days.

(21) Appl. No.: 13/941,178

(22) Filed: Jul. 12, 2013

(65) Prior Publication Data

US 2014/0042354 A1  Feb. 13, 2014

Related U.S. Application Data

(60) Provisional application No. 61/671,061, filed on Jul. 12, 2012.

(51) Int. Cl.
*F16K 3/02* (2006.01)
*F16K 3/30* (2006.01)
*F16K 51/02* (2006.01)
*F16K 3/18* (2006.01)

(52) U.S. Cl.
CPC ........... *F16K 3/0254* (2013.01); *F16K 3/0272* (2013.01); *F16K 3/184* (2013.01); *F16K 3/30* (2013.01); *F16K 51/02* (2013.01)

(58) Field of Classification Search
CPC ........... F16K 1/24; F16K 3/0254; F16K 3/16; F16K 3/18; F16K 3/182; F16K 3/184; F16K 3/3165; F16K 51/02; F16K 3/186; F16K 3/10; F16K 3/14

USPC ......... 251/193, 326, 327–329, 194–204, 158
See application file for complete search history.

(56) References Cited

U.S. PATENT DOCUMENTS

| | | | | |
|---|---|---|---|---|
| 1,722,752 | A * | 7/1929 | Karnath | F16K 3/18 |
| | | | | 251/158 |
| 3,352,535 | A * | 11/1967 | Power | 251/204 |
| 4,573,660 | A * | 3/1986 | Husted | F16K 3/186 |
| | | | | 251/195 |
| 5,026,995 | A * | 6/1991 | Hazaki | F16K 51/02 |
| | | | | 250/442.11 |
| 5,379,983 | A * | 1/1995 | Geiser | 251/167 |
| 6,056,267 | A * | 5/2000 | Schneider | 251/204 |
| 6,896,239 | B1 * | 5/2005 | Brenes | 251/92 |
| 2001/0004106 | A1 * | 6/2001 | Waragai et al. | 251/250 |
| 2002/0134441 | A1 * | 9/2002 | Kusumoto et al. | 137/625.3 |

\* cited by examiner

*Primary Examiner* — Michael R Reid
(74) *Attorney, Agent, or Firm* — Morgan, Lewis & Bockius LLP (57) ABSTRACT

A pressure control valve assembly includes a valve body including a valve opening that is characterized by an axis, a bonnet assembly removably attached to the valve body, wherein the bonnet assembly and the valve body collectively form a valve housing, and the valve housing defines a moving direction that is substantially perpendicular to the axis, a strongback assembly movably disposed in the valve housing and capable of moving in the moving direction defined by the valve housing, and a valve gate movably mounted on the strongback assembly and selectively sealing the valve opening, wherein the bonnet assembly, the strongback assembly and the valve gate are detachable from the valve body and from each other.

17 Claims, 13 Drawing Sheets

GATE OPEN
7% OF O-RING CONTROL CLOSED POSITION
IN THROTTLE CONTROL POSITION

FIG. 3B

GATE OPEN
15% OF O-RING CONTROL CLOSED POSITION
IN THROTTLE CONTROL POSITION

FIG. 3C

FIG. 3D
50% OF WHEEL TRAVEL

FIG. 3E
GATE OPEN
0% OF WHEEL TRAVEL

PRESSURE CONTROL VALVE ASSEMBLY

CROSS-REFERENCES TO RELATED APPLICATIONS

This application claims priority to U.S. Provisional Patent Application No. 61/671,061 filed Jul. 12, 2012 and entitled PRESSURE CONTROL VALVE ASSEMBLY, the entire contents of which is incorporated herein by this reference.

FIELD OF INVENTION

The present invention generally relates to a valve for controlling pressure in a processing chamber, and more specifically to a motorized throttle valve for controlling pressure in a vacuum chamber.

DESCRIPTION OF RELATED ART

Processing chambers, in particular vacuum chambers for manufacturing integrated circuit boards, require pressure control and minimal particulate formation. Typically, gate valves are used for the purpose of pressure control. A gate valve in general includes a valve body that has a valve opening and a valve gate that acts as a throttling element. The valve gate connects to a motor, which moves the valve gate to an open or closed position, or a preset intermediate position to regulate the pressure in the processing chamber. In current gate valve design, a linkage system having a crank and one or more links is used to connect the motor to the valve gate for positioning the valve gate. A ball detent mechanism is used to assist the sealing by pressing the valve gate against the valve opening or a sealing surface of the valve opening.

Although current gate valves can provide pressure control in a processing chamber, they may be at a disadvantage in terms of maintenance serviceability, minimal particulate formation, and/or precise positioning of the valve gate. For instance, the current gate valves need to be dismounted or disassembled in order to access the interior of the valve for a maintenance service, e.g. to repair a sealing member mounted on the valve gate. As a result, the motor and its associated interface need to be recalibrated after the service, causing increased downtime and maintenance cost and lower process throughput. Another disadvantage relates to the particulate formation. Because the linkage system and the ball detent mechanism are employed in the current gate valve design, there exist many metal to metal contacts within the valve body, leading to particulate formation and hence risk of contamination in the processing chamber. In addition, the crank and link system cannot provide a precision control on positioning the valve gate.

In light of the above, it is desirable to provide improved pressure control valves or assemblies that overcome at least some of the above-mentioned challenges.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present application are directed to provide a pressure control valve assembly that provides easy accessibility for maintenance or other services, does not require recalibration after maintenance or other services, minimizes the particulate formation, and/or has a better or precise position control.

One aspect of the present application is directed to provide a pressure control valve assembly comprising a valve body having a valve opening that is characterized by an axis, a bonnet assembly removably attached to the valve body, wherein the bonnet assembly and the valve body collectively form a valve housing, and the valve housing defines a moving direction that is substantially perpendicular to the axis, a strongback assembly movably disposed in the valve housing and capable of moving in the moving direction defined by the valve housing, and a valve gate movably mounted on the strongback assembly and selectively sealing the valve opening, wherein the bonnet assembly, the strongback assembly and the valve gate are detachable from the valve body and from each other.

Another aspect of the present application is directed to provide a pressure control valve assembly comprising a valve housing having a valve opening that is characterized by an axis and defining a moving direction that is substantially perpendicular to the axis, a strongback assembly movably disposed in the valve housing, wherein the strongback assembly moves in the moving direction defined by the valve housing, a guide extending through the valve housing and the strongback assembly and removably secured on the valve housing, the guide retaining the strongback assembly and guiding a movement of the strongback assembly along the moving direction defined by the valve housing, and a valve gate movably mounted on the strongback assembly and selectively sealing the valve opening.

Still another aspect of the present application is directed to provide pressure control valve assembly comprising a valve housing having a valve opening that is characterized by an axis and defining a moving direction that is substantially perpendicular to the axis, a strongback assembly movably disposed in the valve housing, wherein the strongback assembly moves in the moving direction defined by the valve housing, and a valve gate movably mounted on the strongback assembly and selectively sealing the valve opening, wherein the strongback assembly comprises a wheel bar characterized by a front surface that faces the valve gate and is substantially parallel to the moving direction defined by the valve housing, wherein the front surface has an inclination to facilitate positioning of the valve gate or sealing the valve opening.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

In the drawings, like numerals describe similar components throughout the several views. Like numerals having different letter suffixes represent different instances of similar components. The drawings illustrate generally, by way of example, but not by way of limitation, various embodiments disclosed herein.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
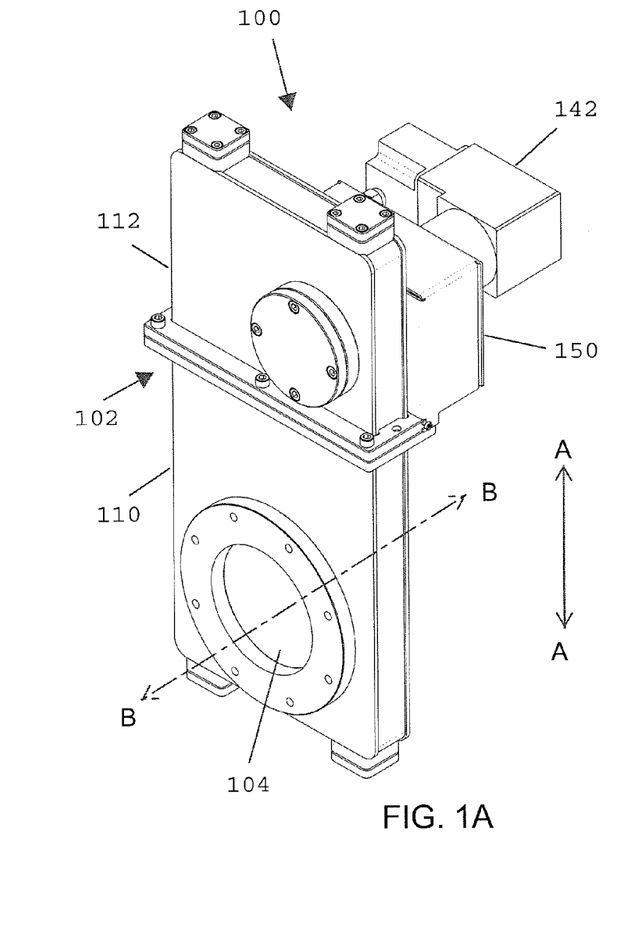
FIG. 1A illustrates a perspective view of an exemplary pressure control valve assembly from a front side in accordance with the present application.
Figure 1B:
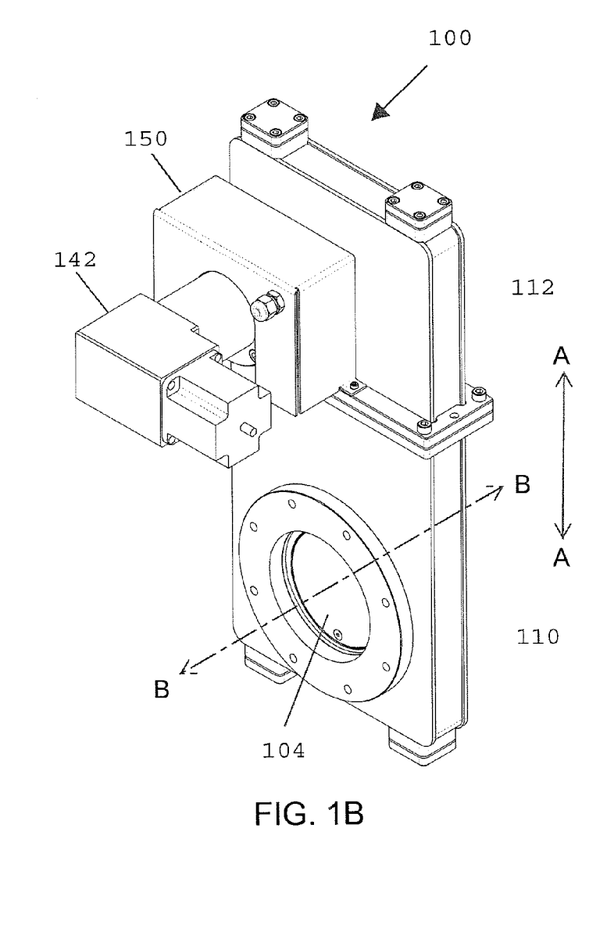
FIG. 1B illustrates a perspective view of an exemplary pressure control valve assembly from a back side in accordance with the present application.
Figure 2:
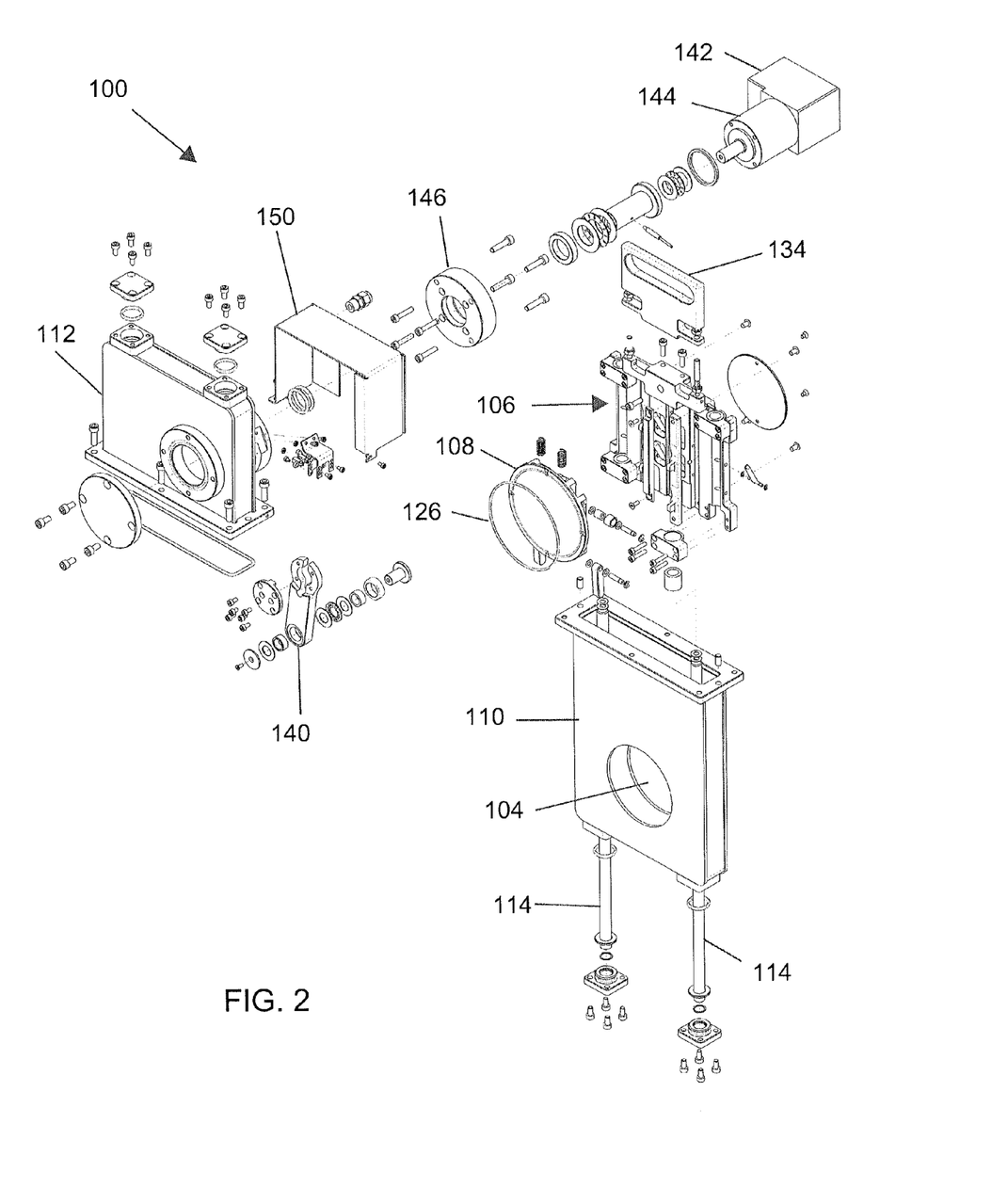
FIG. 2 illustrates a fully exploded view of an exemplary pressure control valve assembly in accordance with the present application.
Figure 2A:
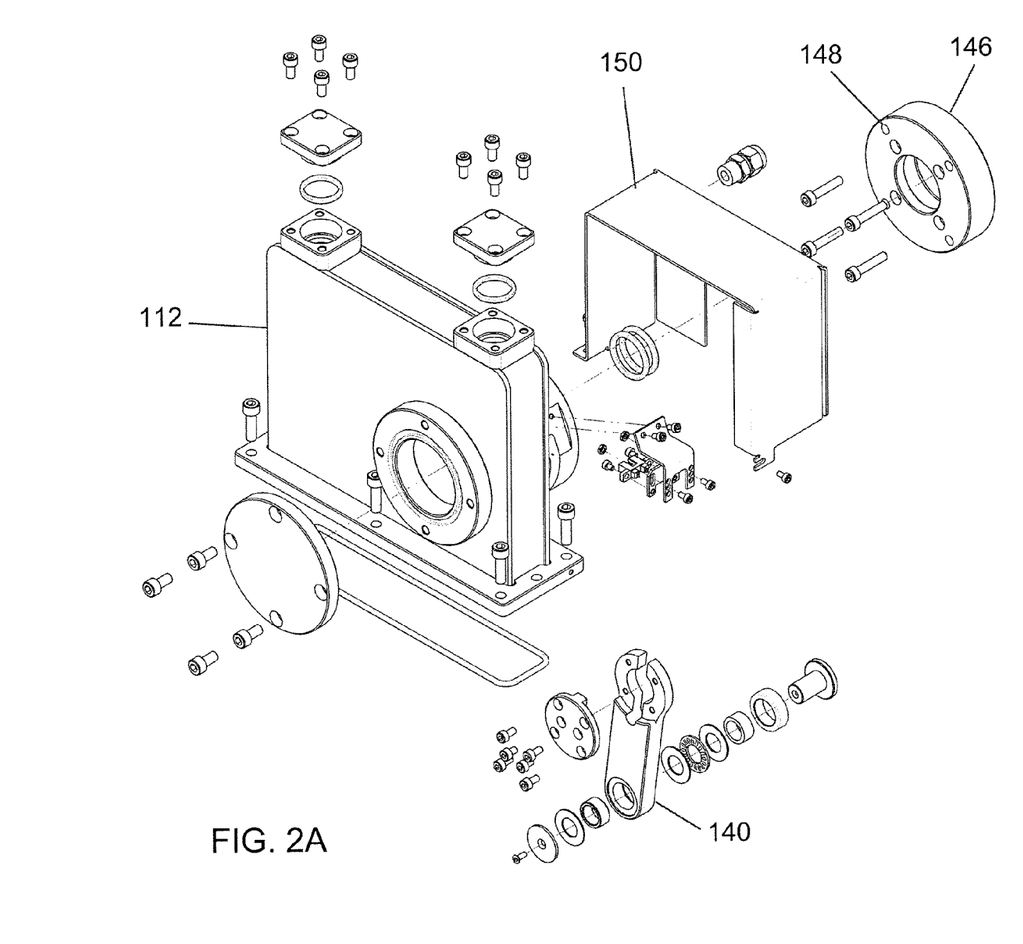
FIG. 2A shows a partially enlarged view of FIG. 2.
Figure 2B:
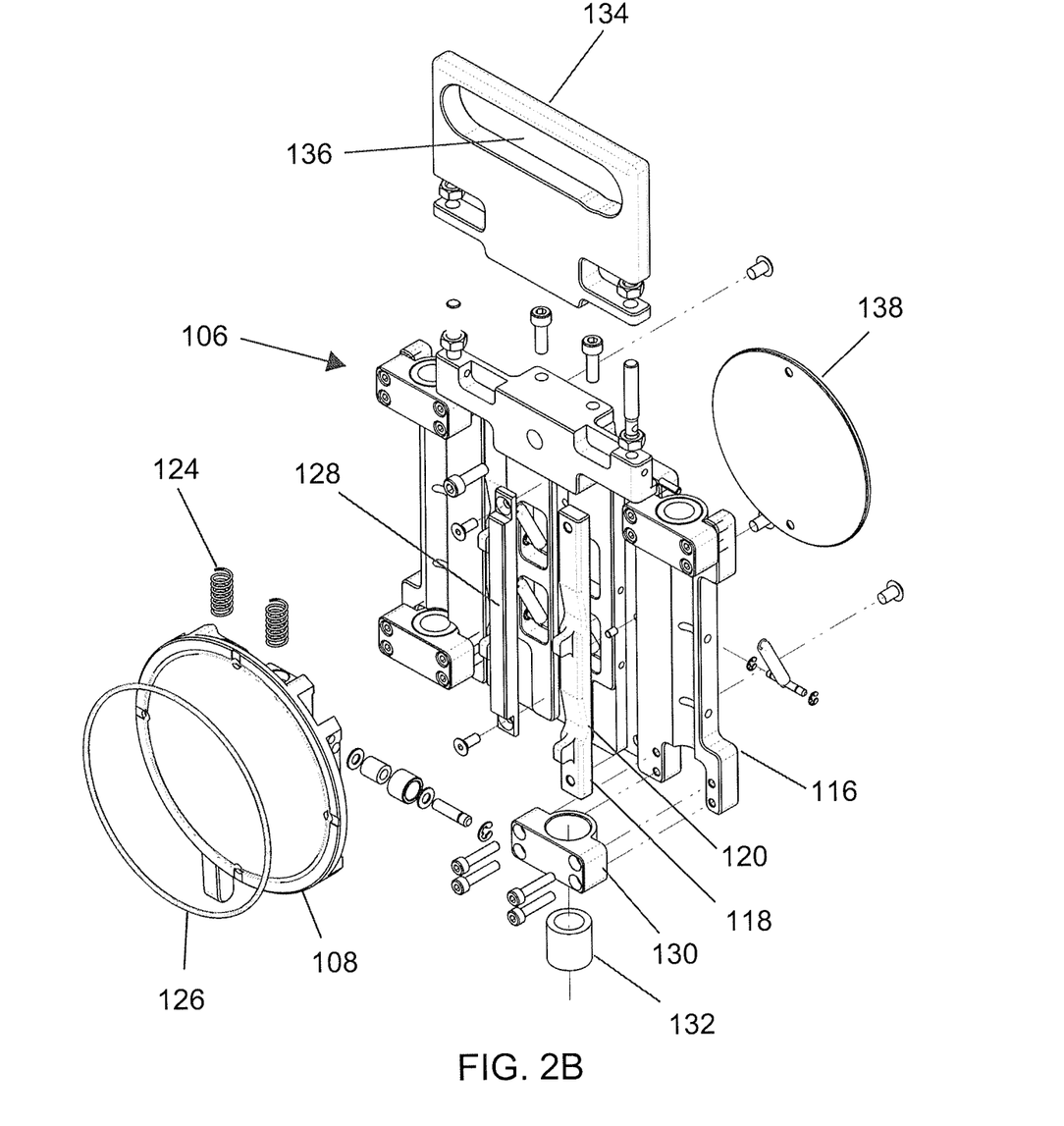
FIG. 2B shows another partially enlarged view of FIG. 2.

Referring to FIGS. 1 and 2, there are respectively depicted a fully assembled and a fully disassembled exemplary pressure control valve assembly 100. In various embodiments, the exemplary pressure control valve assembly 100 generally includes a valve housing 102 that is formed with a valve opening 104, a strongback assembly 106 that is movably disposed with the valve housing 102, and a valve gate 108 that is movably coupled with the strongback assembly 106 and which selectively seals the valve opening 104.

As shown in FIGS. 1A and 1B, the valve housing 102 has a longitudinal axis that generally defines a moving direction, indicated by an arrow A, and the valve opening 104 defines an axis B. The moving direction A defined by the valve housing 102 is generally substantially perpendicular to the axis B of the valve opening 104. In various embodiments, the valve housing 102 may include a valve body 110 and a bonnet assembly 112, wherein the valve opening 104 is located in the valve body 110. Preferably, the valve body 110 and the bonnet assembly 112 are formed separately and removably coupled with each other by mechanical or other suitable means. For example, in various embodiments, the valve body 110 and the bonnet assembly 112 may be removably coupled by mechanical fasteners, such as screws, nuts, pins or brackets.

The strongback assembly 106 is movably disposed in the valve housing 102 and moves in direction A. The valve gate 108 is movably mounted on the strongback assembly 106 to move in direction A with the strongback and in the direction of axis B with respect to the strongback assembly 106. The movement of the strongback assembly 106 and/or the valve gate 108 may be controlled or precisely controlled. At one position, the valve gate 108 fully engages with the valve opening 104 and completely seals the valve opening 104. At another position, the valve gate 108 is positioned completely away or mostly away from the valve opening 104 and accordingly the valve opening 104 is fully open. For controlling or regulating a pressure inside a chamber, the valve gate 108 may be positioned at an intermediate position between the closed position and the open position. At such an intermediate position, the valve gate 108 may be partially engaged with or positioned immediately adjacent the valve opening 104, leading to a partially open and partially closed valve opening 104.

In various embodiments, the exemplary pressure control valve assembly 100 may further include one or more guides 114 that extend through the valve housing 102 and through the strongback assembly 106 along the moving direction A. The guide 114 holds or retains the strongback assembly 106 and guides the movement of the strongback assembly 106 along the moving direction A defined by the valve housing 102. The guide 114 may be elongated and have two ends that may be removably secured to the valve housing 102. For the valve housing 102 having the valve body 110 and the bonnet assembly 112, the guide 114 extends through the valve body 110 and the bonnet assembly 112 along the moving direction A. In various embodiments, one end of the guide 114 is mechanically secured on a wall of the valve body 110 while the other end is mechanically secured on an opposite wall of the bonnet assembly 112. Configuration, including shapes and sizes, of the guide 114 can vary in accordance with the present invention. It may be a bar with a circular cross section, a rail with a rectangular cross section, or any other appropriate configuration. The guide 114 can be made of various metals, ceramics, plastics, and other suitable materials.

In many embodiments, the exemplary pressure control valve assembly 100 may further include a plurality of guides 114, each extending through the valve housing 102 and through the strongback assembly 106 along the moving direction A. For example, in various embodiments, the exemplary pressure control valve assembly 100 includes a pair of guides 114, each extending through the valve housing 102 and through the strongback assembly 106 along the moving direction A. In addition, the pair of guides 114 may be arranged substantially symmetrically with respect to the valve opening 104. As will be described in greater detail, a pressure control valve assembly having a feature like the guide 114 is advantageous, for instance, in positioning the valve gate 108, minimizing the particulate formation, and/or providing easy accessibility for maintenance services.

Still referring to FIG. 2, the strongback assembly 106 in general may include an adjustable mounting platform 116 and various associated components. These components, including those described below, can be machined or can be monolithically or integrally formed with the adjustable mounting platform 116. These components can also be formed separately and then mounted, attached or coupled with the adjustable mounting platform 116. For example, the strongback assembly 106 may include a wheel bar or a plurality of wheel bars 118, and each wheel bar 118 extends substantially in the moving direction A. In various embodiments, the wheel bar 118 may be mechanically secured on the adjustable mounting platform 116.

As shown, the wheel bar 118 has an inclination, such as a ramp or slope, or a plurality of inclinations 120 on a surface that faces the valve gate 108 or the valve opening 104. In various embodiments, the strongback assembly 106 includes a pair of wheel bars 118 that are arranged substantially symmetrically with respect to the valve opening 104, and each wheel bar 118 includes a pair of inclinations 120 on the surface that faces the valve opening 104. However, the configuration and arrangement depicted in FIG. 2 is illustrative only and is not intended to be limiting in any way.

Turning now to FIGS. 3A-3E, there are depicted cross-sectional views of the strongback assembly 106 and the valve gate 108 disposed in various positions in the valve housing 102. As shown, the strongback assembly 106 may further include a wheel or a plurality of wheels 122 on which the valve gate 108 is to be seated in the direction of axis B. The wheel 122 is placed on the surface of the wheel bar 118 that faces the valve opening 104 and travels on such a surface along the moving direction A. Generally, one wheel is provided to associate with a respective inclination. In various embodiments, the strongback assembly 106 further includes an elastic member 124, such as a spring, so that the valve gate 108 is spring-biased against the strongback assembly 106 or against the adjustable mounting platform 116 of the strongback assembly 106 in the moving direct A.

Figure 3A:
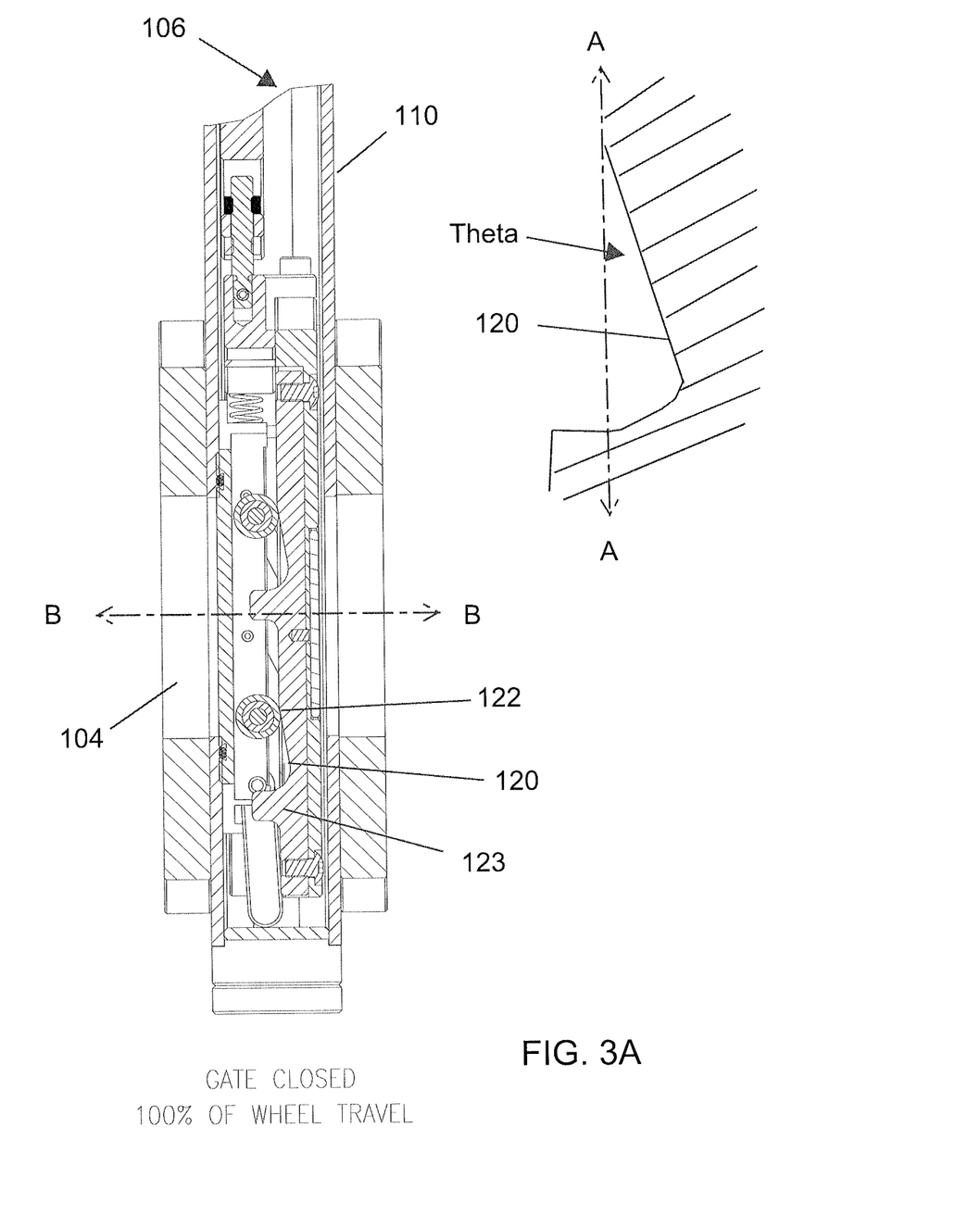
FIG. 3A illustrates a partial cross-sectional view of an exemplary pressure control valve assembly having a wheel bar with an inclination and a wheel at a closed position in accordance with the present application.
Figure 3B:
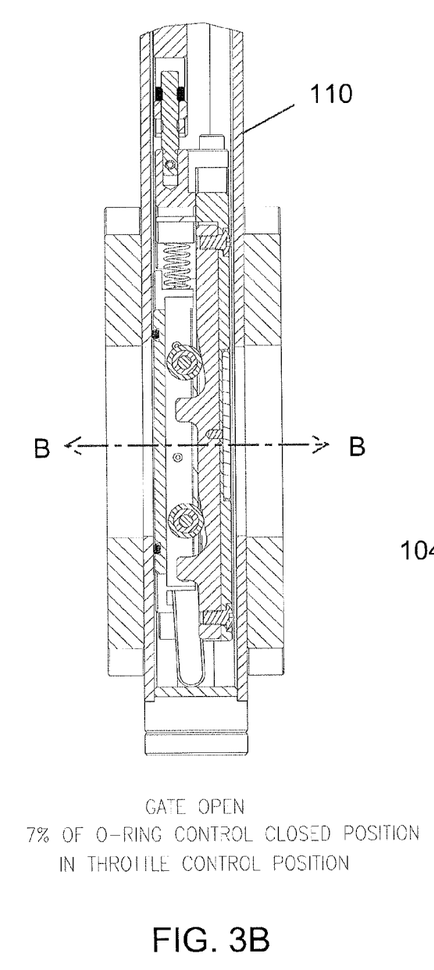
FIG. 3B illustrates a partial cross-sectional view of an exemplary pressure control valve assembly having a wheel bar with an inclination and a wheel at an intermediate position in accordance with the present application.
Figure 3C:
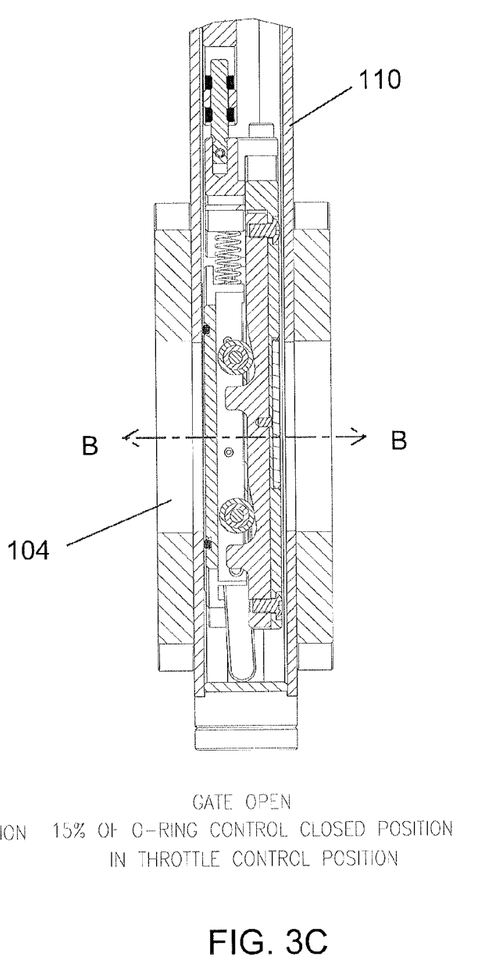
FIG. 3C illustrates a partial cross-sectional view of an exemplary pressure control valve assembly having a wheel bar with an inclination and a wheel at another intermediate position in accordance with the present application.
Figures 3D, 3E:
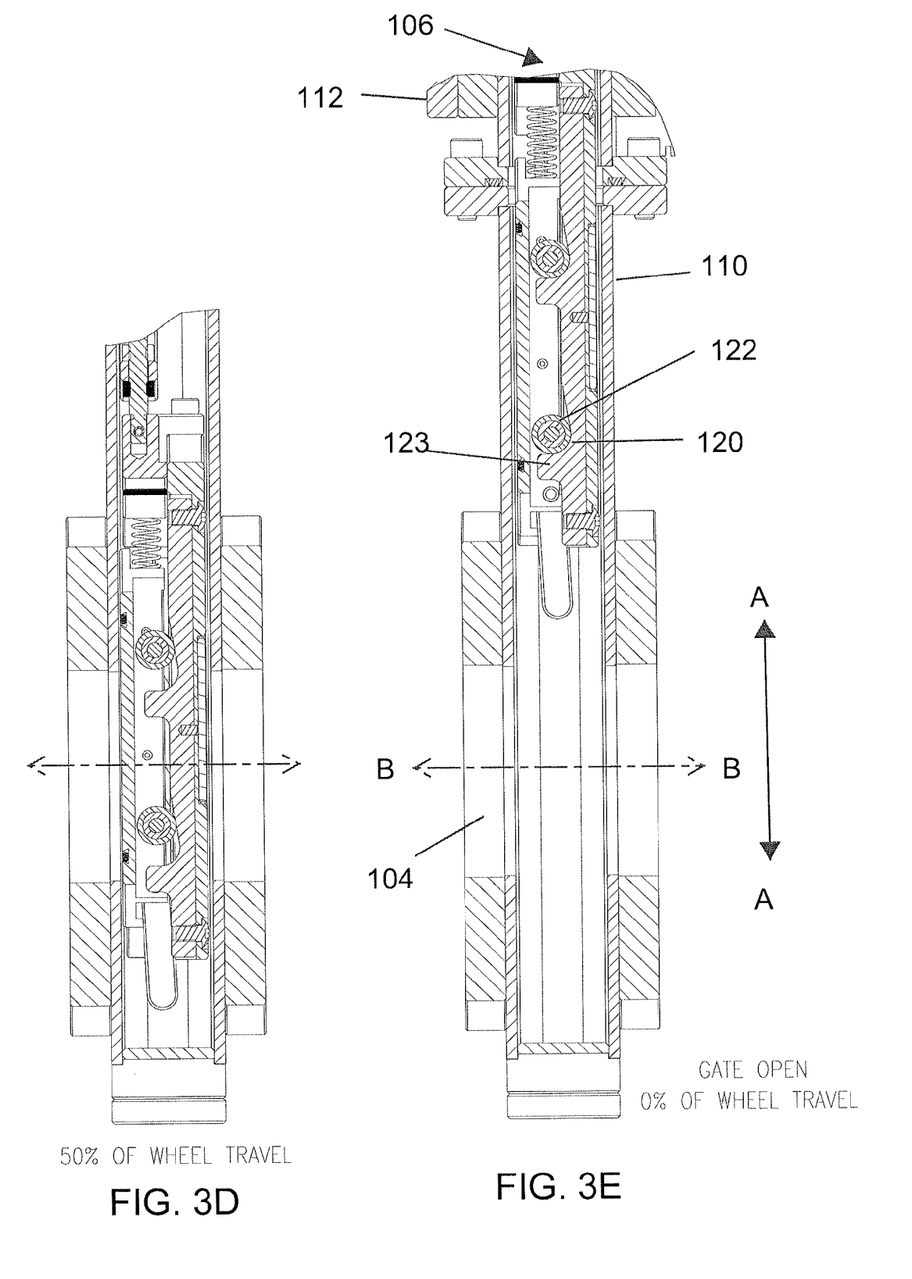
FIG. 3D illustrates a partial cross-sectional view of an exemplary pressure control valve assembly having a wheel bar with an inclination and a wheel at yet another intermediate position in accordance with the present application.
FIG. 3E illustrates a partial cross-sectional view of an exemplary pressure control valve assembly having a wheel bar with an inclination and a wheel at an open position in accordance with the present application.

As the strongback assembly 106 moves from one position to another within the valve housing 102, the wheel 122 is poised at different locations relative to the inclination 120. For example, when the strongback assembly 106 moves to a position such that the valve gate 108 engages the valve opening 104, the wheel 122 is poised at or near the top of the inclination 120, as shown in FIG. 3A. As a result, the wheel 122 pushes the valve gate 108 toward the valve opening 104 and seals the valve opening 104 more tightly. On the contrary, when the strongback assembly 106 moves away from the valve opening 104 such that the valve opening 104 is fully open, the wheel 122 is poised at or near the bottom of the inclination 120, as shown in FIG. 3E. Herein, the top and the bottom of the inclination 120 refer to positions at inclination 120 with respect to the valve opening 104 along the axis B. As a result of the retraction of the wheel 122 along the axis B, the valve gate 108 is loosened. This may reduce any unnecessary contact or friction of the valve gate 108 with other components, and thus improve the lifespan of the valve gate 108. When the strongback assembly 106 is disposed in an intermediate position, the wheel 122 is poised accordingly in between the top and the bottom of the inclination 120, as shown in FIGS. 3B-3D.

Depending on the application, such as the pressure range to be controlled, the inclination 120 may be configured with various profiles or contours, either curved or linear. Preferably, the inclination 120 may be configured to have a linear profile with respect to the moving direction A and along the axis. A linear profile provides a simple linear correlation between the pushing of the valve gate 108 by the wheel 122 toward the valve opening 104 and the distance travelled by the wheel 122 along the moving direction A. Accordingly, the position of the valve gate 108 can be easily determined and thus precisely controlled, leading to a better pressure control for a chamber.

Usually, the inclination 120 is configured to have an inclination angle with respect to the moving direction A that is less than approximately 30 degrees. Preferably, the inclination 120 is configured to have an inclination angle that is from about 2.5 degrees to about 20 degrees. More preferably, the inclination 120 is configured to have an inclination angle of about 10 degrees. The inclination 120 may be about 0.1 inches to about 0.8 inches long, or preferably about 0.3 inches to about 0.6 inches, along the moving direction A, however, one will appreciate that the actual inclination angle and length may vary.

With an inclination angle of 10 degrees and a length of 0.54 inches, an inclination 120 can provide a capability of pushing the valve gate 108 toward the valve opening 104 of about 0.03 inches. That is, it takes the wheel 122 to travel along the moving direction A for about 0.54 inches to push the valve gate 108 toward the valve opening 104 by about 0.03 inches. To achieve the same amount of pushing, an inclination 120 with an inclination angle of 20 degrees needs to be about 0.27 inches. That is, the wheel 122 needs to travel along the moving direction A for about half of the distance as with an inclination of 10 degrees angle.

In various embodiments, the wheel bar 118 may further include a protrusion 123 protruded from the front surface adjacent to the inclination 120, or each of the inclinations, for assisting retention of the wheel 122. The height of the protrusion 123 along the axis B is in general less than the diameter of the wheel 122.

In various embodiments, the pressure control valve assembly 100 may additionally include a sealing member 126, such as an O-ring shown in FIG. 2, to assist the sealing of the valve opening 104. The sealing member 126 may be attached to the periphery of the valve gate 108. As the wheel 122 pushes the valve gate 108 toward the valve opening 104, the sealing member 126 may deform and fill any gap that may exist.

Referring back to FIG. 2, in various embodiments, the strongback assembly 106 may further include a wheel guide or guide rail 128 that is positioned adjacent to the wheel guide 128. The wheel guide 128 may be machined, formed with or secured on the adjustable mounting platform 116. For an embodiment having a plurality of wheel bars 118, the strongback assembly 106 may include a corresponding wheel guide 128 for each of the wheel bars 118. The wheel guide 128 prevents a wheel, and hence a valve gate 108 seating on the wheel, from moving side to side. Accordingly, the wheel guide 128 assists the positioning of the valve gate 108 and the controlling of the pressure in a chamber.

To take the advantages of the guide 114, the strongback assembly 106 may further include coupling means that receives the guide 114 and slidably couples with the guide 114. For example, the strongback assembly 106 may include a pillow block 130 and a respective bearing 132, or a plurality of pillow blocks 130 with a plurality of respective bearings 132, to facilitate the appropriate coupling. For one guide 114, the strongback assembly 106 may include a pair of pillow blocks 130 with a pair of respective bearings 132, which may be machined, formed with or secured on the adjustable mounting platform 116 at different positions along the moving direction A. In various embodiments, the strongback assembly 106 includes two pairs of pillow blocks 130 and respective bearings 132, each pair corresponding to one guide 114.

In various embodiments, the strongback assembly 106 may further include an adjustable bar 134 that may be machined, formed with or secured on the adjustable mounting platform 116. The adjustable bar 134 may be formed with a cutout, such as a slot 136 in FIG. 2 for connecting the strongback assembly 106 to a driving force that moves the strongback assembly 106 along the moving direction A within the valve housing 102. The cutout 136 is typically elongated in a direction substantially perpendicular to the moving direction A. In various embodiments, the elongation direction of the cutout 136 may be perpendicular to the axis B of the valve opening as well. In various embodiments, the strongback assembly 106 may further include a cover 138 that may be formed or mounted to the back side of the adjustable mounting platform 116 to protect the strongback assembly 106. Herein, the back side of the adjustable mounting platform 116 refers to the side facing away from the valve opening 104.

Still referring to FIG. 2, the exemplary pressure control valve assembly 100 may further include a connecting member 140, such as a lifting arm, to facilitate connection of the strongback assembly 106 to a driving force. In embodiments wherein the valve housing 102 includes the valve body 110 and the bonnet assembly 112, the lifting arm 140 is typically located in or associated with the bonnet assembly 112 so that it may be removed with the bonnet assembly. In various embodiments, the drive force comes from an actuator 142 that is mounted on the valve housing 102 or the bonnet assembly 112 of the valve housing 102. The actuator 142 can be of pneumatic, electric or other suitable type. In various embodiments, it may be a stepper motor. With a stepper motor, feedback sensors may be unnecessary because it can be commanded to move and hold at one of equally divided steps. The actuator 142 in general has a shaft 144, on which one end of the lifting arm 140 is affixed. The other end of the lifting arm 140 is connected to the strongback assembly 106. The connection of the lifting arm 140 with the strongback assembly 106 may be through the cutout 136 of the adjustable bar 134.

Figure 4A:
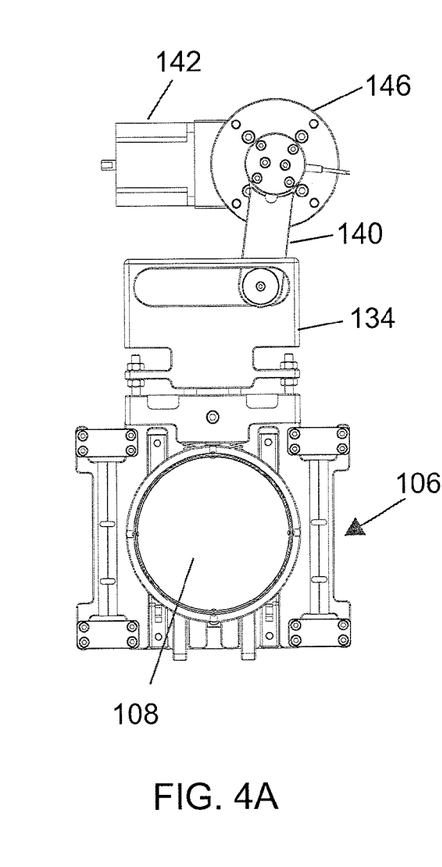
FIG. 4A illustrates a driving mechanism of an exemplary pressure control valve assembly at a closed position in accordance with the present application.
Figure 4B:
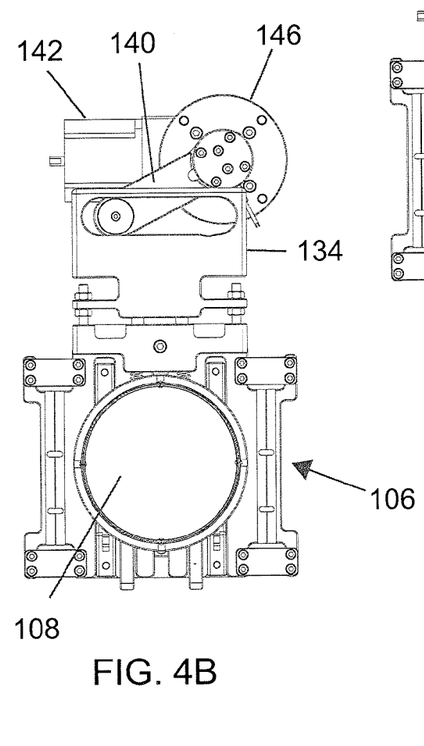
FIG. 4B illustrates a driving mechanism of an exemplary pressure control valve assembly at an intermediate position in accordance with the present application.
Figure 4C:
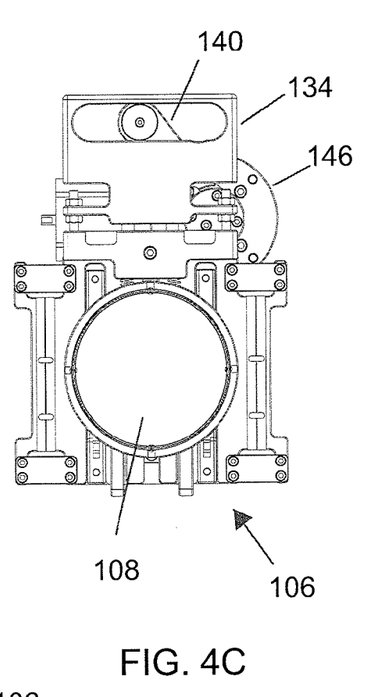
FIG. 4C illustrates a driving mechanism of an exemplary pressure control valve assembly at an open position in accordance with the present application.
Figures 5A, 5B, 5C:
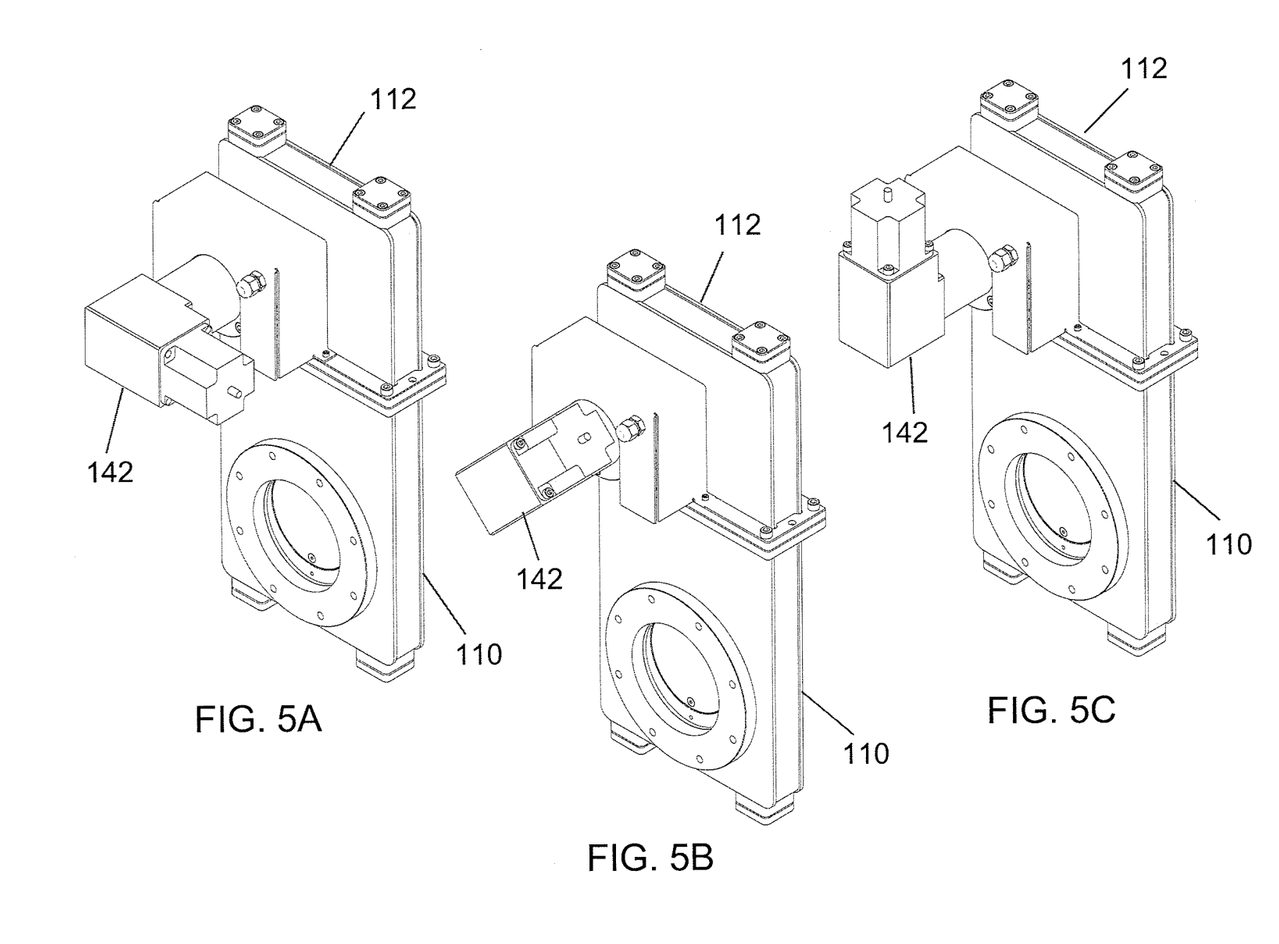
FIGS. 5A-5E illustrate perspective views of an exemplary pressure control valve assembly having an actuator mounted at different positions in accordance with the present application.
Figure 5D:
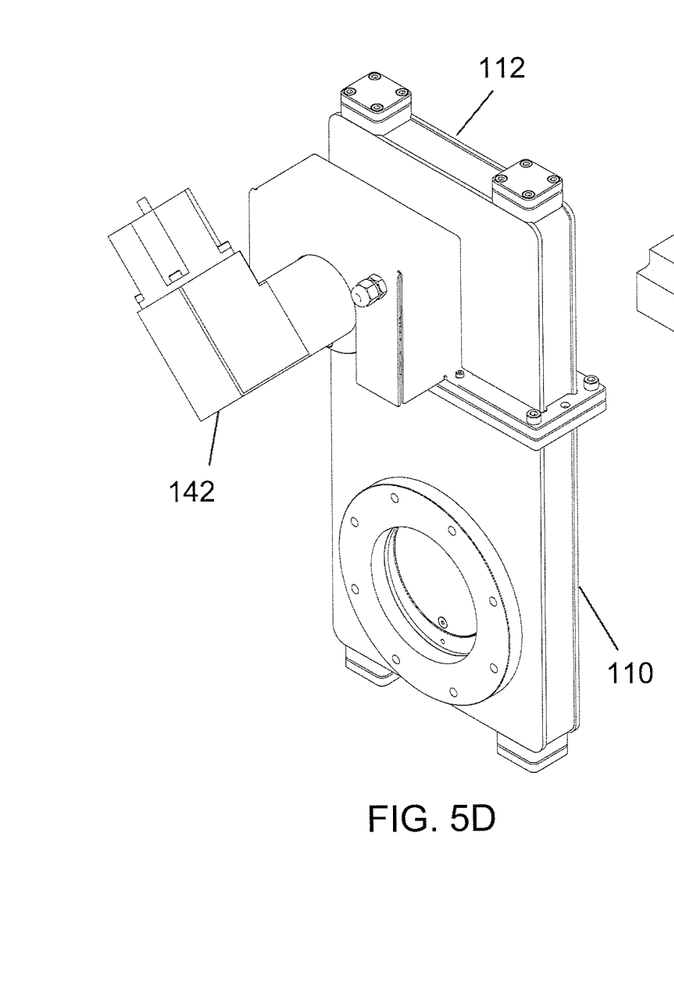
Figure 5E:
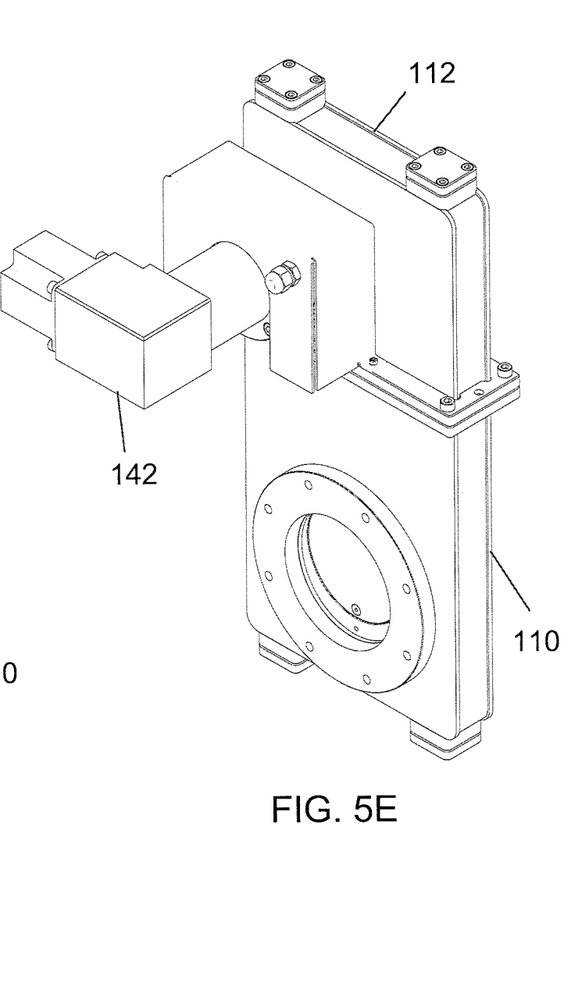
Figure 6A:
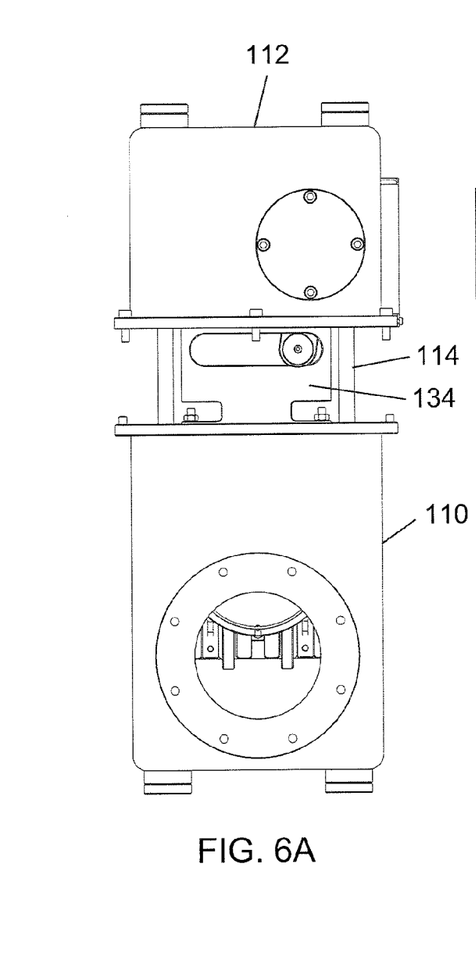
FIG. 6A illustrates a front view of an exemplary pressure control valve assembly in accordance with the present application, showing a bonnet assembly dismounted from a valve body.
Figure 6B:
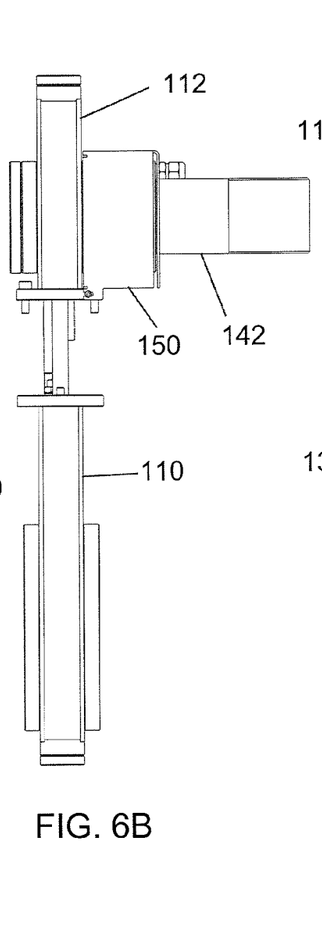
FIG. 6B illustrates a side view of an exemplary pressure control valve assembly in accordance with the present application, showing a bonnet assembly dismounted from a valve body.
Figure 6C:
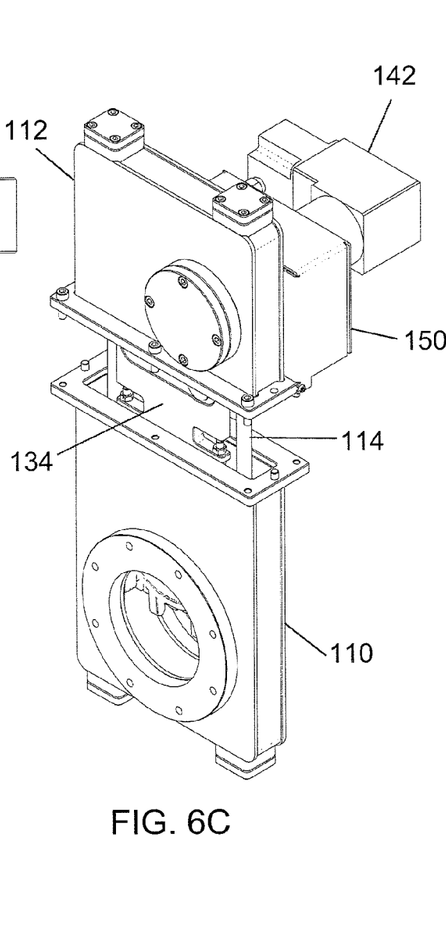
FIG. 6C illustrates a perspective view of an exemplary pressure control valve assembly in accordance with the present application, showing a bonnet assembly dismounted from a valve body.
Figures 7A, 7B:
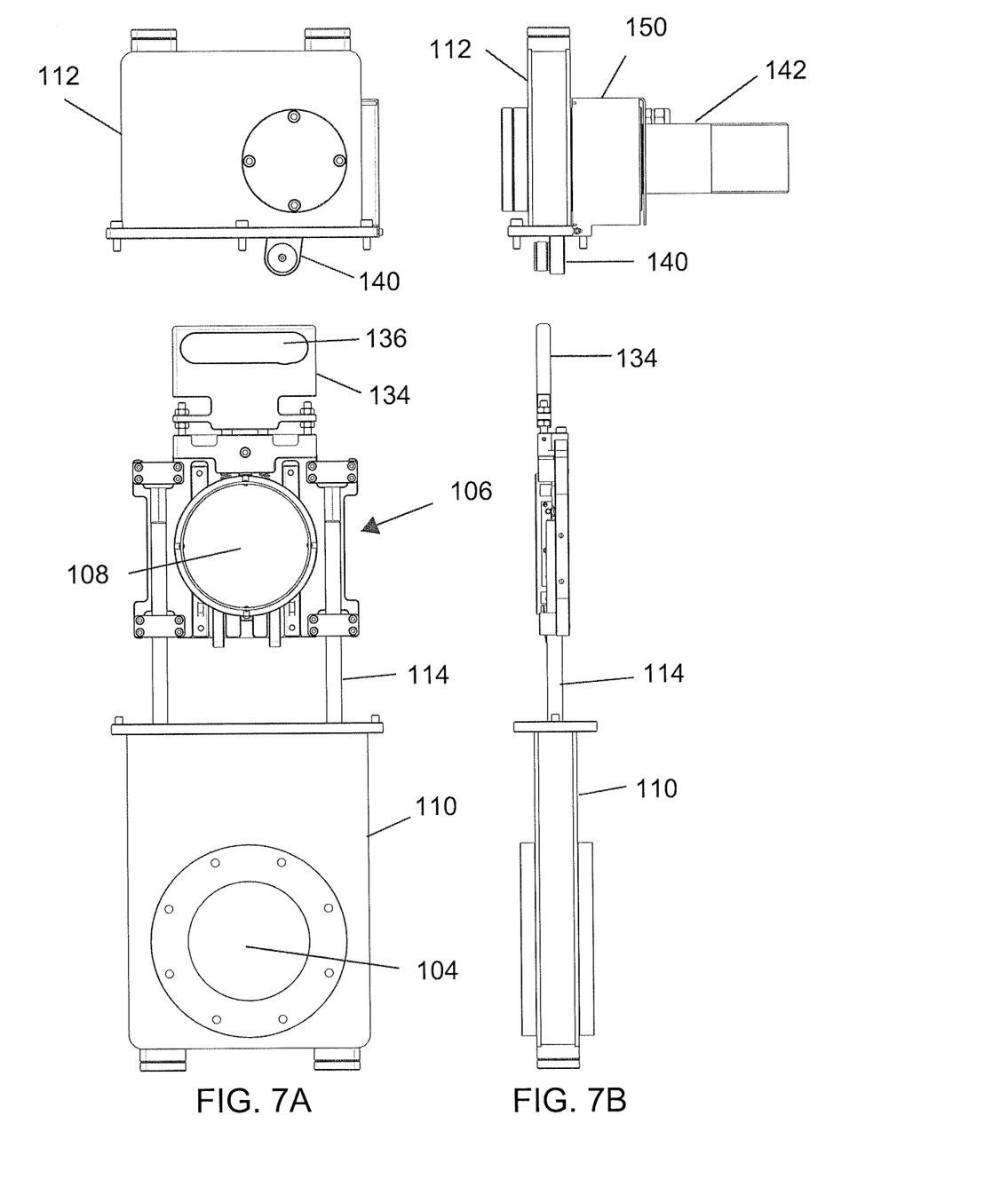
FIG. 7A illustrates a front view of an exemplary pressure control valve assembly in accordance with the present application, showing a bonnet assembly dismounted from a valve body and from a strongback assembly.
FIG. 7B illustrates a side view of an exemplary pressure control valve assembly in accordance with the present application, showing a bonnet assembly dismounted from a valve body and from a strongback assembly.
Figure 7C:
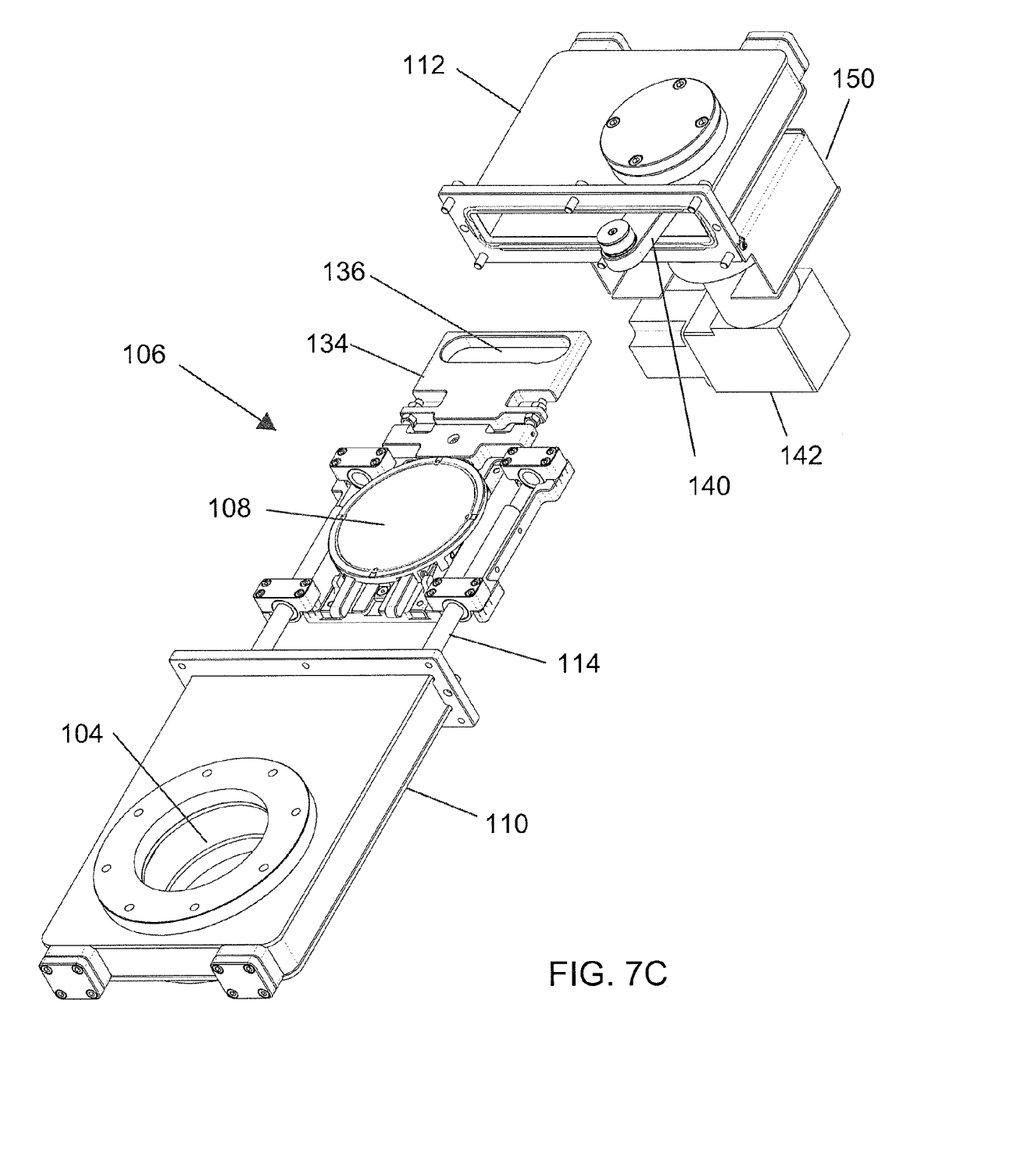
FIG. 7C illustrates a perspective view of an exemplary pressure control valve assembly in accordance with the present application, showing a bonnet assembly dismounted from a valve body and from a strongback assembly.

Turning now to FIGS. 4A-4C, there is depicted a driving mechanism of an exemplary pressure control valve assembly 100 in accordance with the present application. As shown, the lifting arm 140 is affixed on the shaft 144 of the actuator 142 at one end and slidably coupled with the cutout 136 of the adjustable bar 134 at the other end. As the actuator 142 turns the shaft 144, the lifting arm 140 intends to turn along with the shaft 144. Since the other end of the lifting arm 140 is slidably coupled with the cutout 136 and the strongback assembly 106 is retained by the guide 114, the lifting arm 140 turns and glides simultaneously along the elongated direction of the cutout 136. As a result, the lifting arm 140 pulls or pushes the strongback assembly 106 along the moving direction A, and places the strongback assembly 106 at a desired position. For example, FIGS. 4A-4C illustrate the strongback assembly 106 placed at a closed, an intermediate, or an open position, respectively.

Turning back to FIG. 2, the exemplary pressure control valve assembly 100 may further include a gearbox mounting platform or a gearbox mounting plate 146 that provides multiple mounting options for the actuator 142 to accommodate a specific chamber, which may have a limited space. For example, the gearbox mounting platform 146 may include a plurality of circumferentially distributed mounting holes 148. These mounting holes can be distributed either evenly with an equal incremental angle or unevenly with varied angles. With the gearbox mounting platform 146, the actuator 142 can be turned and mounted in different orientations, such as those shown in FIGS. 5A-5E. In many embodiments, the gearbox mounting platform 146 is secured on the valve housing 102 or the bonnet assembly 112 of the valve housing 102. The gearbox mounting platform 146 may be secured on the same side or different side of the valve housing 102 as the valve opening 104.

In various embodiments, the pressure control valve assembly 100 may further include a cover, such as a sensor cover 150 that is typically mounted on the valve housing 102 or the bonnet assembly 112 of the valve housing 102. The sensor cover 150 serves as a shield to protect any sensor that may be incorporated with the pressure control valve assembly 100. Examples of sensors include photodetectors and/or photo-indicators for position control.

Compared to conventional pressure control valves, the pressure control valve assembly 100 of the present application is advantageous in many ways. For example, referring to FIGS. 6A-7C, with a configuration having separated but removably connected valve body 110 and bonnet assembly 112, the pressure control valve assembly 100 allows the removal of the bonnet assembly 112 while the valve body 110 stays attached to a chamber. In combination of the guide 114, the pressure control valve assembly 100 further allows the removal or pulling out of the strongback assembly 106 and the valve gate 108 without detaching the valve body 110 or the entire unit from a chamber. This is advantageous in that it provides an easy access to the interior of the valve assembly for any preventive maintenance or other service. Furthermore, the pressure control valve assembly 100 of the present application allows the strongback assembly 106, the valve gate 108 and the actuator 142 stay connected while in maintenance or other services. Accordingly, the pressure control valve assembly 100 eliminates the need for recalibration necessary for conventional pressure control valves, and thus reducing downtime and maintenance cost and increasing process throughput.

Another advantage of the pressure control valve assembly 100 of the present application is that it provides linear and more precise control on positioning the valve gate 108 and thus better pressure control for a process chamber. This is because the pressure control valve assembly 100 utilizes the guide, the lift arm, and/or the wheel bar 118 with an inclination 120 to position the valve gate 108. In addition, the pressure control valve assembly 100 of the present invention may minimize the particulate formation because the usage of the guide 114 reduces the contact of the strongback assembly 106 with the valve housing 102 and in particular with the valve body 110 of the valve housing 102.

For convenience in explanation and accurate definition in the appended claims, the terms "front" or "back", "top" or "bottom", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pressure control valve assembly comprising:
a valve body including a valve opening having an opening axis;
a bonnet assembly removably attached to the valve body, wherein the bonnet assembly and the valve body collectively form a valve housing;
a strongback assembly movably disposed in the valve housing along a moving direction that is substantially perpendicular to the opening axis;
a valve gate movably mounted on the strongback assembly and selectively sealing the valve opening; and
a guide elongated in the moving direction and extending through the valve housing and the strongback assembly with one end removably secured on a wall of the valve body and the other end removably secured on an opposite wall of the bonnet assembly such that (i) the guide retains the strongback assembly, (ii) the guide guides the strongback assembly to move along the moving direction and (iii) the bonnet assembly, the strongback assembly and the valve gate form a subassembly that is detachable from the valve body,
wherein the strongback assembly and the valve gate are detachable entirely from each other.

2. A pressure control valve assembly comprising:
a valve body including a valve opening having an opening axis;
a bonnet assembly removably attached to the valve body, wherein the bonnet assembly and the valve body collectively form a valve housing;
a strongback assembly movably disposed in the valve housing along a moving direction that is substantially perpendicular to the opening axis;
a valve gate movably mounted on the strongback assembly and selectively sealing the valve opening; and
a guide elongated in the moving direction and extending through the valve housing and the strongback assembly with one end removably secured on a wall of the valve body and the other end removably secured on an opposite wall of the bonnet assembly such that (i) the guide retains the strongback assembly, (ii) the guide guides the strongback assembly to move along the moving direction and (iii) the bonnet assembly, the strongback assembly and the valve gate form a subassembly that is detachable from the valve body,
wherein the strongback assembly comprises a wheel bar characterized by a front surface that faces the valve gate and is substantially parallel to the moving direction defined by the valve housing, wherein the front surface includes an inclination, and the strongback assembly further comprises a wheel moving on the front surface of the wheel bar in the moving direction to facilitate positioning of the valve gate or sealing the valve opening.

3. A pressure control valve assembly comprising:
a valve housing including a valve opening that is characterized by an axis and defining a moving direction that is substantially perpendicular to the axis;
a strongback assembly movably disposed in the valve housing, wherein the strongback assembly moves in the moving direction defined by the valve housing;
a guide elongated in the moving direction and extending through the valve housing and the strongback assembly with one end removably secured on a wall of the valve housing and the other end removably secured on an opposite wall of the valve housing, the guide retaining the strongback assembly and guiding a movement of the strongback assembly along the moving direction defined by the valve housing; and
a valve gate movably mounted on the strongback assembly and selectively sealing the valve opening,
wherein the strongback assembly and the valve gate are detachable entirely from each other.

4. The pressure control valve assembly of claim 3, wherein the valve housing includes a valve body including the valve opening and a bonnet assembly removably attached to the valve body, and wherein the bonnet assembly, the strongback assembly and the valve gate are detachable from the valve body and from each other.

5. A pressure control valve assembly comprising:
a valve housing including a valve opening that is characterized by an axis and defining a moving direction that is substantially perpendicular to the axis;
a strongback assembly movably disposed in the valve housing, wherein the strongback assembly moves in the moving direction defined by the valve housing;
a guide elongated in the moving direction and extending through the valve housing and the strongback assembly with one end removably secured on a wall of the valve housing and the other end removably secured on an opposite wall of the valve housing, the guide retaining the strongback assembly and guiding a movement of the strongback assembly along the moving direction defined by the valve housing; and
a valve gate movably mounted on the strongback assembly and selectively sealing the valve opening,
wherein the strongback assembly comprises a wheel bar characterized by a front surface that faces the valve gate and is substantially parallel to the moving direction defined by the valve housing, wherein the front surface includes an inclination, and the strongback assembly further comprises a wheel moving on the front surface of the wheel bar in the moving direction to facilitate positioning of the valve gate or sealing the valve opening.

6. A pressure control valve assembly comprising:
a valve housing including a valve opening having an opening axis;
a strongback assembly movably disposed in the valve housing along a moving direction that is substantially perpendicular to the opening axis;
a guide elongated in the moving direction and extending through the valve housing and the strongback assembly with one end removably secured on a wall of the valve housing and the other end removably secured, on an opposite wall of the valve housing, the guide retaining the strongback assembly and guiding a movement of the strongback assembly along the moving direction; and
a valve gate movably mounted on the strongback assembly and selectively sealing the valve opening;
wherein the strongback assembly includes an elongated wheel bar extending in the moving direction and including an inclination, and a wheel moving along the wheel bar in the moving direction to facilitate positioning of the valve gate with a camming action.

7. The pressure control valve assembly of claim 6, wherein the valve housing includes a valve body including the valve opening and a bonnet assembly removably attached to the valve body, and wherein the one end of the guide is removably secured on a wall of the valve body and the other end of the guide is removably secured on an opposite wall of the bonnet assembly such that the bonnet assembly, the strongback assembly and the valve gate are detachable from the valve body and from each other.

8. The pressure control valve assembly of claim 6, wherein the strongback assembly comprises a pillow block with a bearing for receiving and slidably coupling with the guide to retain and guide the movement of the strongback.

9. The pressure control valve assembly of claim 6, wherein the strongback assembly comprises a pair of pillow blocks, each with a bearing, for receiving and slidably coupling with the guide to retain and guide the movement of the strongback.

10. The pressure control valve assembly of claim 7, further comprising an actuator that is rotatably mounted on the bonnet assembly and connected to the strongback assembly for driving the strongback assembly to move in the moving direction within the valve housing.

11. The pressure control valve assembly of claim 10, wherein the actuator is a stepper motor.

12. The pressure control valve assembly of claim 10, wherein the bonnet assembly further comprises a lifting arm characterized by two ends, wherein one end of the lifting arm is affixed on a shaft of the actuator and the other end thereof is connected to the strongback assembly.

13. The pressure control valve assembly of claim 10, further comprising a gearbox mounting platform secured on the valve housing, wherein the gearbox mounting platform provides multiple mounting options for mounting the actuator.

14. A pressure control valve assembly comprising:
a valve housing including a valve opening having an opening axis;
a strongback assembly movably disposed in the valve housing along a moving direction that is substantially perpendicular to the opening axis;
a guide elongated in the moving direction and extending through the valve housing and the strongback assembly with one end removably secured on a wall of the valve housing and the other end removably secured on an opposite wall of the valve housing, the guide retaining the strongback assembly and guiding a movement of the strongback assembly along the moving direction; and
a valve gate movably mounted on the strongback assembly and selectively sealing the valve opening;
wherein the strongback assembly comprises a pair of wheel bars that are arranged substantially symmetrically with respect to the valve opening, wherein each wheel bar is characterized by a front surface that faces the valve gate and is substantially parallel to the moving direction defined by the valve housing, wherein the front surface includes an inclination to facilitate positioning of the valve gate or sealing the valve opening.

15. The pressure control valve assembly of claim 14, wherein the front surface of each wheel bar includes a plurality of inclinations, and each inclination has a linear profile with respect to the moving direction.

16. The pressure control valve assembly of claim 14, wherein the inclination on the front surface of each wheel bar has an angle from about 5 degrees to about 30 degrees with respect to the moving direction; and
wherein the inclination on the front surface of each wheel bar has a length along the moving direction from about 0.1 inches to about 0.8 inches.

17. The pressure control valve assembly of claim 14, wherein the strongback assembly further includes a protrusion protruded from the front surface adjacent to the inclination for assisting retention of a wheel.

* * * * *